(12) United States Patent
Hu (10) Patent No.: US 8,098,665 B2
(45) Date of Patent: *Jan. 17, 2012

(54) METHOD AND SYSTEM FOR AUTOMATING MEMBERSHIP DISCOVERY IN A DISTRIBUTED COMPUTER NETWORK

(75) Inventor: Cheng-Hong Hu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 281 days.

This patent is subject to a terminal disclaimer.

(21) Appl. No.: 12/242,501

(22) Filed: Sep. 30, 2008

(65) Prior Publication Data

US 2009/0028162 A1   Jan. 29, 2009

Related U.S. Application Data

(63) Continuation of application No. 10/654,645, filed on Sep. 3, 2003, now Pat. No. 7,447,212.

(51) Int. Cl.
*H04L 12/28* (2006.01)

(52) U.S. Cl. .................................. 370/395.3; 370/395.5

(58) Field of Classification Search .................. 370/393, 370/395.3, 392, 395.1, 389–390, 236, 395.5
See application file for complete search history.

(56) References Cited

U.S. PATENT DOCUMENTS

| | | | |
|---|---|---|---|
| 6,493,349 B1 | 12/2002 | Casey | |
| 7,260,097 B2 * | 8/2007 | Casey | 370/392 |
| 7,266,124 B2 * | 9/2007 | Kim et al. | 370/397 |
| 7,436,782 B2 * | 10/2008 | Ngo et al. | 370/254 |
| 7,447,212 B2 | 11/2008 | Hu | |
| 7,570,648 B2 * | 8/2009 | Hu et al. | 370/396 |
| 7,609,628 B2 * | 10/2009 | Hu | 370/230 |
| 7,623,457 B2 * | 11/2009 | Hu | 370/235 |

(Continued)

FOREIGN PATENT DOCUMENTS

EP   1351450   10/2003

(Continued)

OTHER PUBLICATIONS

Sajassi (VPLS Architectures draft-sajassi-vpls-architectures-00.txt, Mar. 21, 2002).*

(Continued)

*Primary Examiner* — Salman Ahmed
(74) *Attorney, Agent, or Firm* — Toler Law Group (57) ABSTRACT

Methods for automating membership discovery in a distributed computer network are presented. A particular method includes establishing a Multi-Protocol Label Switching (MPLS) tunnel and Targeted Label Distribution Protocol (LDP) signaling channel between a first Provider Edge (PE) device and a plurality of PE devices. A first Virtual Private LAN Service (VPLS) site is added to a Multi-Tenant Unit (MTU) device associated with the first PE device. A first LDP Label Mapping Message is sent to the first PE device from the MTU device. The first LDP Label Mapping Message is broadcast to the plurality of PE devices from the first PE device. A second LDP Label Mapping Message is sent to the MTU device from the first PE device to establish a virtual circuit label switch path between the MTU device and the first PE device. A second VPLS site is added to the MTU device without sending an associated LDP Label Mapping Message to the first PE device. A respective one VPLS site of the first VPLS site or the second VPLS site is deleted using a configuration command.

15 Claims, 9 Drawing Sheets

U.S. PATENT DOCUMENTS

| | | | | |
|---|---|---|---|---|
| 7,643,424 | B2* | 1/2010 | Liu et al. | 370/236.2 |
| 7,711,000 | B2* | 5/2010 | Hu et al. | 370/465 |
| 7,792,123 | B2* | 9/2010 | Hu | 370/395.53 |
| 2002/0080794 | A1* | 6/2002 | Reeves et al. | 370/395.2 |
| 2002/0186433 | A1* | 12/2002 | Mishra | 359/128 |
| 2003/0142674 | A1* | 7/2003 | Casey | 370/393 |
| 2003/0154259 | A1* | 8/2003 | Lamberton et al. | 709/213 |
| 2003/0167348 | A1* | 9/2003 | Greenblat | 709/251 |
| 2003/0174706 | A1* | 9/2003 | Shankar et al. | 370/393 |
| 2004/0037296 | A1* | 2/2004 | Kim et al. | 370/395.53 |
| 2004/0085997 | A1* | 5/2004 | Mancour | 370/466 |
| 2004/0088389 | A1* | 5/2004 | Shah | 709/221 |
| 2004/0151120 | A1* | 8/2004 | Shankar et al. | 370/249 |
| 2004/0151180 | A1* | 8/2004 | Hu et al. | 370/392 |
| 2004/0153570 | A1* | 8/2004 | Shobatake | 709/238 |
| 2004/0165600 | A1* | 8/2004 | Lee | 370/395.53 |
| 2004/0174887 | A1* | 9/2004 | Lee | 370/395.53 |
| 2004/0184407 | A1* | 9/2004 | Pok et al. | 370/236 |
| 2004/0258069 | A1* | 12/2004 | Serbest et al. | 370/395.1 |
| 2004/0264389 | A1* | 12/2004 | Abdo et al. | 370/255 |
| 2005/0018605 | A1* | 1/2005 | Foote et al. | 370/230 |
| 2005/0027782 | A1* | 2/2005 | Jalan et al. | 709/200 |
| 2005/0044262 | A1* | 2/2005 | Luo | 709/238 |
| 2005/0089047 | A1* | 4/2005 | Ould-Brahim et al. | 370/395.53 |
| 2005/0147104 | A1* | 7/2005 | Ould-Brahim | 370/395.5 |
| 2005/0169270 | A1* | 8/2005 | Mutou et al. | 370/390 |
| 2005/0213513 | A1* | 9/2005 | Ngo et al. | 370/254 |
| 2006/0041682 | A1* | 2/2006 | Johnson et al. | 709/242 |
| 2006/0062218 | A1* | 3/2006 | Sasagawa | 370/389 |
| 2006/0182122 | A1* | 8/2006 | Davie et al. | 370/395.53 |
| 2006/0291447 | A1* | 12/2006 | Siliquini et al. | 370/352 |
| 2007/0019676 | A1* | 1/2007 | Kompella | 370/468 |
| 2007/0127479 | A1* | 6/2007 | Sinicrope et al. | 370/392 |
| 2007/0206492 | A1* | 9/2007 | Zelig et al. | 370/218 |
| 2007/0263634 | A1* | 11/2007 | Reeves et al. | 370/395.2 |
| 2008/0043740 | A1* | 2/2008 | Doverspike et al. | 370/392 |
| 2008/0101390 | A1* | 5/2008 | Hu | 370/401 |
| 2008/0225695 | A1* | 9/2008 | Balus et al. | 370/216 |
| 2008/0240125 | A1* | 10/2008 | Purvis et al. | 370/401 |
| 2008/0285466 | A1* | 11/2008 | Salam et al. | 370/241.1 |
| 2009/0028162 | A1* | 1/2009 | Hu | 370/395.53 |
| 2009/0074413 | A1 | 3/2009 | Bannai et al. | |
| 2009/0154453 | A1* | 6/2009 | Shah et al. | 370/389 |
| 2009/0168780 | A1* | 7/2009 | Unbehagen et al. | 370/392 |
| 2009/0185495 | A1* | 7/2009 | Zi | 370/244 |
| 2010/0284308 | A1* | 11/2010 | Lv | 370/254 |
| 2010/0316060 | A1* | 12/2010 | Purvis et al. | 370/401 |
| 2011/0080836 | A1* | 4/2011 | Bragg et al. | 370/241.1 |

FOREIGN PATENT DOCUMENTS

| | | |
|---|---|---|
| EP | 1619833 | 1/2006 |

OTHER PUBLICATIONS

Sajassi et al. (VPLS Architectures draft-sajassi-vpls-architectures-00.txt, Feb 20, 2002).*

Metro Ethernet—deploying the extended campus using Ethernet technology; Brockners, F.; Finn, N.; Phillips, S.; Cisco Syst. Inc., San Jose, CA, USA This paper appears in: Local Computer Networks, 2003. LCN '03. Proceedings. 28th Annual IEEE International Conference on Issue Date: Oct. 20-24, 2003.*

Virtual Private Network / Multi Protocol Label Switching; E Klute, R Schott, R Geib—DFN-Arbeitstagung ueber 2002.*

Pseudo-Wire Edge-to-Edge (PWE3) Working Group Stewart Bryant; Internet Draft Lloyd Wood; Document: <draft-ietf-pwe3-protocol-layer-00.txt> Mark Townsley; Expires: Nov. 2002 Cisco Systems Ltd; Danny McPherson; TCB May 2002.*

VPN Technologies—A Comparison; M Finlayson, J Harrison—Data Connection Limited, 2003.*

Service provider networking infrastructures with MPLS HF Badran—2001. Proceedings. Sixth IEEE Symposium on, 2001.*

Knight P., et al. "Network Based IP VPN Architecture Using Virtual Routers", Network Working Group; Internal Draft; draft-ietf-13vpn-vpn-vr-02.bd; Apr. 2004.

Capuano, Mike "VPLS: Scalable Transparent LAN Services", Mar. 2003; Juniper Networks, Inc.

Andersson, L., et al. "LDP Specification", RFC 3036; Jan. 2001; The Internet Society.

Raszuk, Robert "VPLS/TLS/VPSN . . . ", ftp://ftp-eng.cisco.com/rraszuk/vpls; Jul. 12, 2002.

Chen, Michael et al. "Decoupled/Hierarchical VPLS: Commonalities and Differences", Provider Provisioned VPN WG; Internet Draft; draft-che-ppvpn-compare-00.txt; Mar. 2002.

Stokes, Olen, et al. "Testing Hierarchical Virtual Private LAN Services", Provider Provisioned VPN WG, Internet Draft Document, draft-stokes-vkompella-ppvpn-hvpls-oam-01.bd; Dec. 2002.

Lasserre, Marc et al. "Virtual Private LAN Services Over MPLS", Provider Provisioned VPN Working Group, Internet Draft Document, draft-lasserre-vkompella-ppvpn-vpls-02.txt; Jun. 2002.

Kompella, K. et al. "Virtual Private LAN Service"; Network Working Group; Internet Draft; draft-kompella-ppvpnvpls-01.txt; May 2003.

* cited by examiner

| 0 | 0 | VC TLV | FEC (00x0100) | C | VC Type | Length | | |
|---|---|---|---|---|---|---|---|---|
| | | | | | Group ID | | | VC Info Length |
| | | | | | VC ID (VPN-ID) | | | |
| | | | | | Interface Parameters | | | |
| | | | | | Site-ID sub-TLV | | | |
| | | | | | Site-ID sub-TLV | | | |

METHOD AND SYSTEM FOR AUTOMATING MEMBERSHIP DISCOVERY IN A DISTRIBUTED COMPUTER NETWORK

CLAIM OF PRIORITY

This application claims priority from and is a continuation of U.S. patent application Ser. No. 10/654,645 filed Sep. 3, 2003, entitled "METHOD AND SYSTEM FOR AUTOMATING MEMBERSHIP DISCOVERY IN A DISTRIBUTED COMPUTER NETWORK," and is hereby incorporated by reference in its entirety.

FIELD OF THE DISCLOSURE

The present disclosure relates generally to distributed computer networks, and to the automation of membership discovery in a distributed computer network.

BACKGROUND

A virtual provider local area network (LAN) service, also known as a VPLS, is a class of virtual provider networks (VPNs) that allow multiple customer sites to be connected where the sites appear to be on the same LAN (distributed network). VPLS service is typically offered over a provider managed Internet protocol/multi label switching (IP/MPLS) infrastructure. A VPLS could have up to a few hundred, or even thousands of sites across the entire distributed network.

Based upon the VPLS architecture model described in Internet Engineering Task Force (IETF) documents, the following manual provisioning steps may need to be repeated when adding, deleting, or modifying a customer site: 1) Add, delete, or modify a customer site to an attached multi tenant unit (MTU); 2) Add, delete, or modify a MPLS VC (multi-protocol switch path virtual circuit) between the MTU and its attached physical edge (PE) device; and, 3) Add, delete or modify a MPLS VC between a pair of PEs that are associated with the VPLS.

Manually configuring a large quantity of VPLS service sites requires significant coordination efforts for site-to-site connectivity provisioning. Due to the nature of the provisioning complexity, manual steps often cause mistakes and troubleshooting difficulties, and slow down the overall service provisioning process.

Accordingly, a need exists for an improved method and system for provisioning of distributed computer networks.

BRIEF DESCRIPTION OF THE DRAWINGS

The use of the same reference symbols in different drawings indicates similar or identical items.

DETAILED DESCRIPTION

The present disclosure is generally directed to automating discovery of device membership in a virtual private local area network service (VPLS) site over a distributed computer network. In a particular embodiment, a method is presented for automating membership discovery in a distributed network such as a virtual provider local area net service (VPLS). The method includes establishing a first virtual circuit label switch path (VC LSP) between a first multi tenant unit (MTU) device and a provider edge (PE) device attached to the MTU, the VC LSP being associated with a first virtual private local area network service (VPLS) site. A first label mapping message (LMM) communicated by the MTU is received at the PE device, and the PE attached PE device sends a second LMM to the MTU device. The second LMM serves to establish a bi-directional virtual circuit (VC) label switch path (LSP). The attached PE then broadcasts the first LMM to a plurality of additional PE devices.

In another embodiment, a second virtual private LAN service site is added to the distributed computer network. The second virtual private LAN service site is attached to the first multi tenant unit device. A second LMM, with a first virtual circuit (VC) label associated with the first VC LSP and a non-updated site identification (ID) list, is broadcast to the plurality of additional PE devices.

In an embodiment, a first virtual circuit label switch path (VC LSP) is established between a first multi tenant unit (MTU) device and a provider edge (PE) device attached to the MTU. The VC LSP is associated with a first virtual private local area network service (VPLS) site. A first label mapping message (LMM) communicated over the first VCLSP is received at the PE device, and the first LMM is broadcast by the PE device to a plurality of additional PE devices. In a particular embodiment, the first label mapping message has an identical virtual circuit label and an updated site identification (site ID) list with respect to a second label mapping message.

In a further embodiment, a virtual circuit forward equivalence class (VC-FEC) packet to automate membership discovery in connection with a service provider distributed network is presented. The VC-FEC packet includes a first field to identify a VC encapsulation type, a second field to identify a group identification element, a third field to identify a VC connection, an interface parameter field to define a MTU device parameter, and a sub-tag length value field specifying a particular site identifier associated with an origination site of the virtual circuit forwarding equivalence class packet.

In another embodiment, a multi-protocol label switching (MPLS) system is disclosed. The system comprises a first computing node and a second computing node coupled to the first computing node. The second computing node receives and stores a VC-FEC packet for use in automatic membership discovery.

In a particular embodiment, a method is presented for automating membership discovery in a distributed network such as a virtual provider local area net service (VPLS) network. The method includes establishing a first virtual circuit label switch path (VC LSP) between a first multi tenant unit (MTU) device and a provider edge (PE) device, e.g., a router, attached to the MTU, and establishing a VC LSP between a local PE and a remote PE. Multi-protocol switch path virtual circuit (MPLS VC) connectivity among customer sites is automatically established across a provider's network using Label Mapping Messages (LMMs), as defined in Internet Engineering Task Force (IETF) document Label Distribution Protocol (LDP) Specification RFC 3036, and LDP message relay mechanisms described herein. A PE device performs address learning when a customer packet is received for the first time on the PE device. In response to the discovery process and address learning, a site identification (ID) table, e.g., an address table, is created/updated at the PE device. Then, customer packet forwarding follows the proper VC LSP, based upon a lookup to the address learning table at the PE device.

In a particular embodiment, another method is presented for automating membership discovery in a distributed network such as a virtual provider local area net service (VPLS). The method includes establishing a virtual circuit label switch path (VC LSP) between a multi tenant unit (MTU) device and a provider edge (PE) device attached to the MTU, and establishing a VC LSP between a local PE and a remote PE. The method also includes populating an address-learning (site ID-learning) table along with membership discovery. MPLS VC connectivity among customer sites and address learning is automatically established across the provider's network using modified Label Mapping Messages with a virtual circuit forward equivalence class (FEC) and label distribution protocol (LDP) message relay mechanisms described herein. Following the discovery and address learning processes, customer packet forwarding to the proper VC LSP occurs, based on the result of an address (site ID) table lookup at the PE device.

Figure 1:
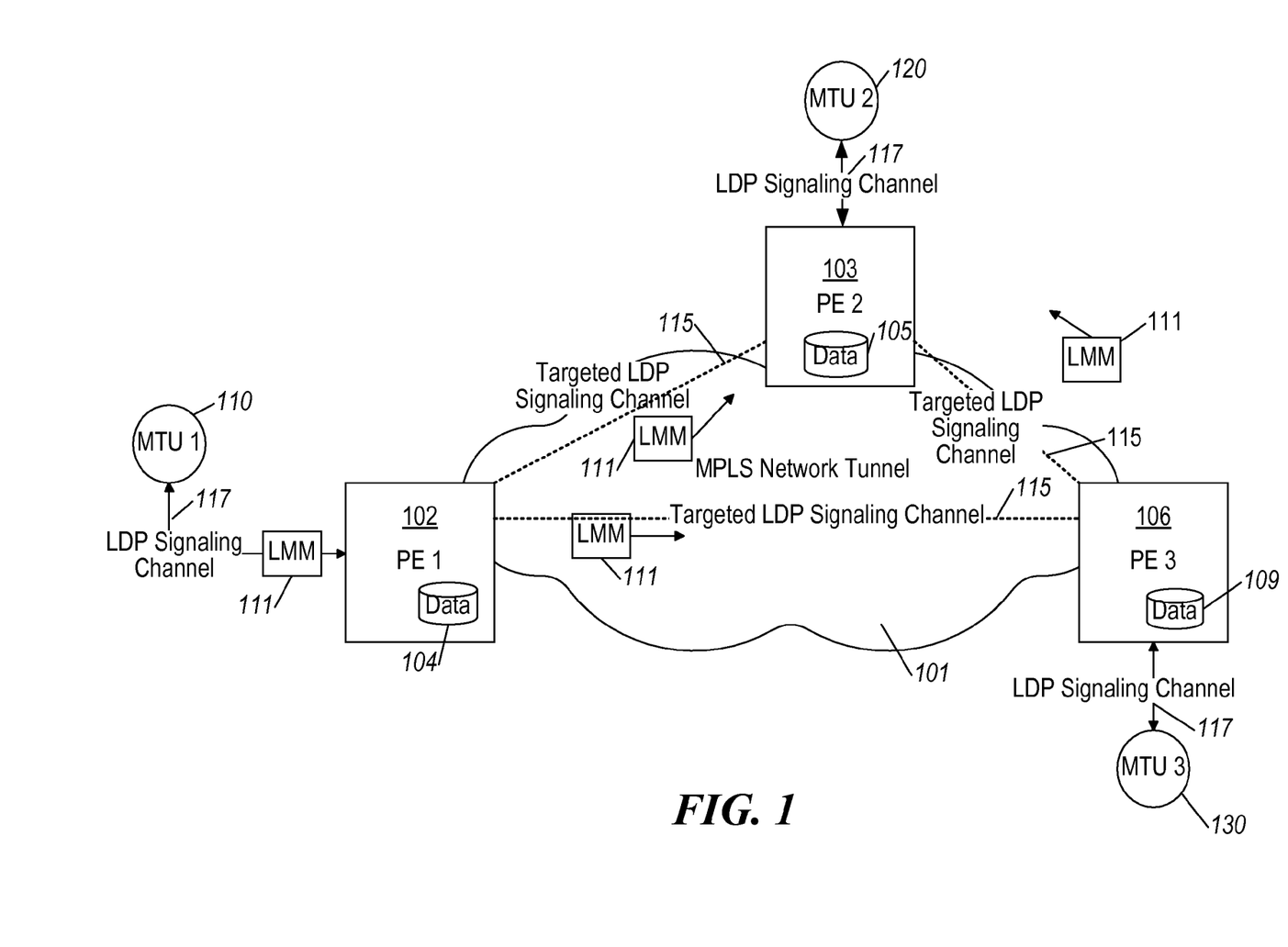
FIG. 1 is a simplified block diagram illustrating a Virtual Private LAN Service over MPLS (a distributed computer network)

FIG. 1 illustrates, in simplified block diagram form, an embodiment of a distributed computer network. The distributed computer network shown in the example of FIG. 1 presents three multi-tenant units (MTUs) and their associated provider edge (PE) devices; however, it will be appreciated that many more MTUs and PE devices could be provisioned and deployed.

The distributed computer network encompasses MTU devices MTU1 110, MTU2 120, and MTU3 130, and their respective attached PE devices, which are PE1 102, PE2 103, and PE3 106. In the example of FIG. 1, the MTUs are not situated in the same geographic location, that is, they are associated with different sites. Each provider edge device maintains its own local database, thus PE1 102 has a local database 104, PE2 103 has a local database 105, and PE3 106 has its local database 109.

In FIG. 1, a multi-protocol label switching (MPLS) network tunnel 101 linked switch paths (LSPs) are established between PEs. In addition, targeted label data path (LDP) sessions are set up between PE devices 102, 103, and 106. These targeted LDP sessions are indicated by the lines between PE devices 102, 103, and 106, the lines being labeled Targeted LDP Signaling Channel. The targeted LDP sessions are set up in liberal label retention mode. Label Data Path (LDP) signaling channel sessions are set up between MTU1 110 and its attached PE1 102, between MTU2 120 and its attached PE2 103, and between MTU3 130 and its attached PE3 106 device. These channel sessions are indicated by the lines 117 between MTUs and their respective PE devices, labeled LDP Signaling Channel in FIG. 1.

In the example of FIG. 1, a label mapping message (LMM) 111 is sent to PE1 device 102, and subsequently broadcast by PE1 device 102 to its peering PE devices 103 and 106. The information contained in LMM 111 is received and stored in each of the databases 104, 105, and 109. The LMM 111 is broadcast over a TCP (Transport Control Protocol) session between PEs.

Figure 2:
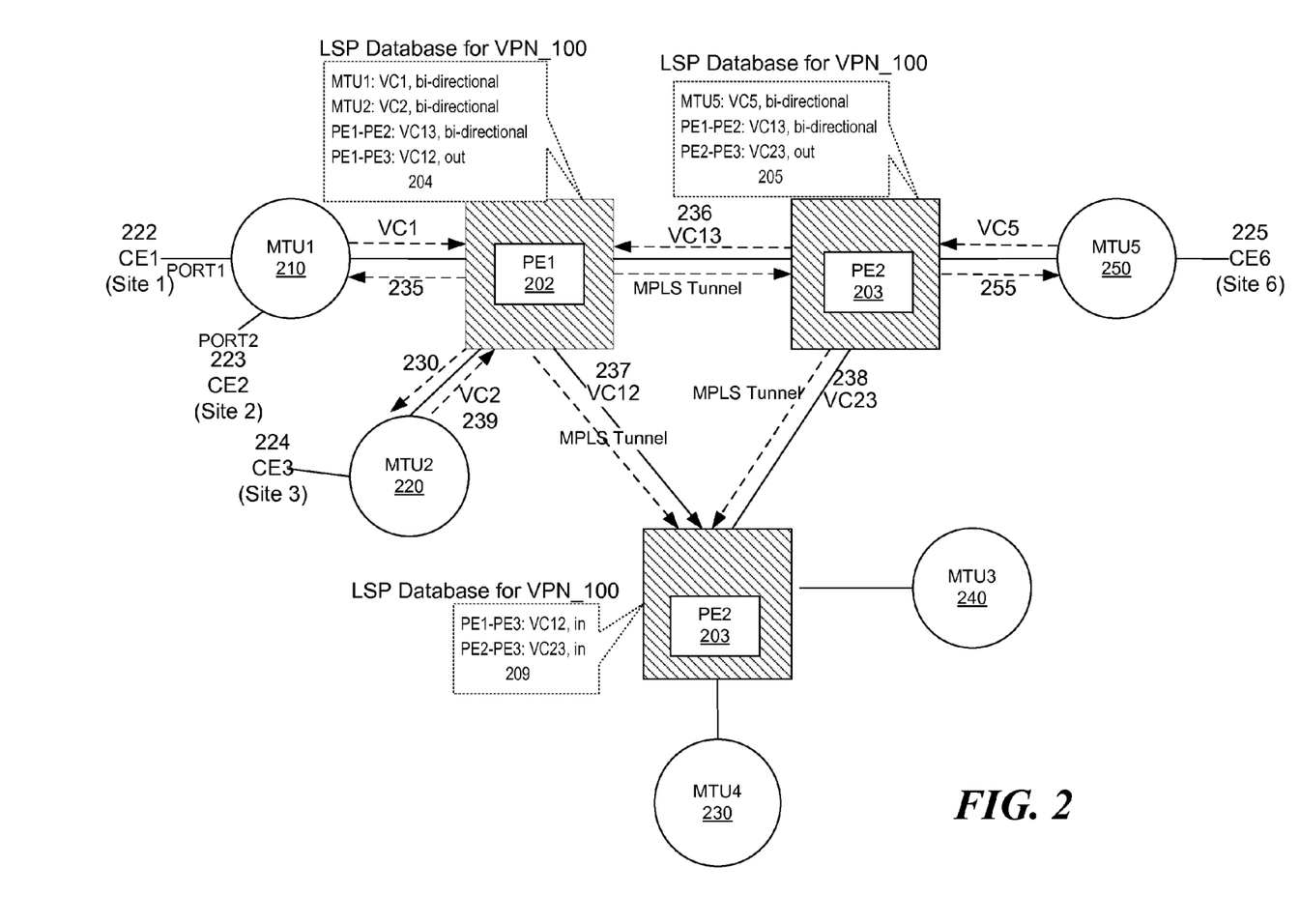
FIG. 2 is a block diagram illustrating a method for VPLS membership discovery between an MTU and its corresponding (provider edge) PE, as well as between local and remote PEs.

FIG. 2 is a block diagram illustrating VPLS membership discovery multi tenant units (MTUs) and their respective provider edge (PE) devices. The system illustrated in FIG. 2 contains a number of sites, denoted by customer equipment CE1 222, CE2 223, CE3 224, and CE6 225. As before, the particular number of sites, MTUs, and PEs are presented for illustration and are typically of greater number than shown. In the example of FIG. 2, a virtual label switch path 255 is established between PE2 203 and MTU5 250 at site CE6 225. Virtual label switch paths 235 and 239 are established between MTU1 210 and PE 202, and MTU 2 220 and PE1 101. In addition, virtual label switch paths 236, 237, and 238 are established over MPLS tunnel LSPs between PE devices 202, 203, and 206.

In a particular embodiment, a first virtual label switch path such as 235 is established between a first multi-tenant unit 210 and its respective attached provider edge device 202. The virtual label switch path 235 is associated with a first virtual private local area network service (VPLS) site, such as site 222. A first label mapping message (LMM, not shown) is configured at MTU1 210, and the first LMM is communicated over a TCP session to PE device 202. PE device 202 receives the LMM, and broadcasts the first LMM to the other PE devices 203 and 206 over TCP sessions between PEs.

The information regarding the paths and devices for the established VC sessions is contained in the first LMM, and this information is stored in the respective local databases. An example of this information is shown in the database captions numbered 204, 205, and 209.

Figure 3:
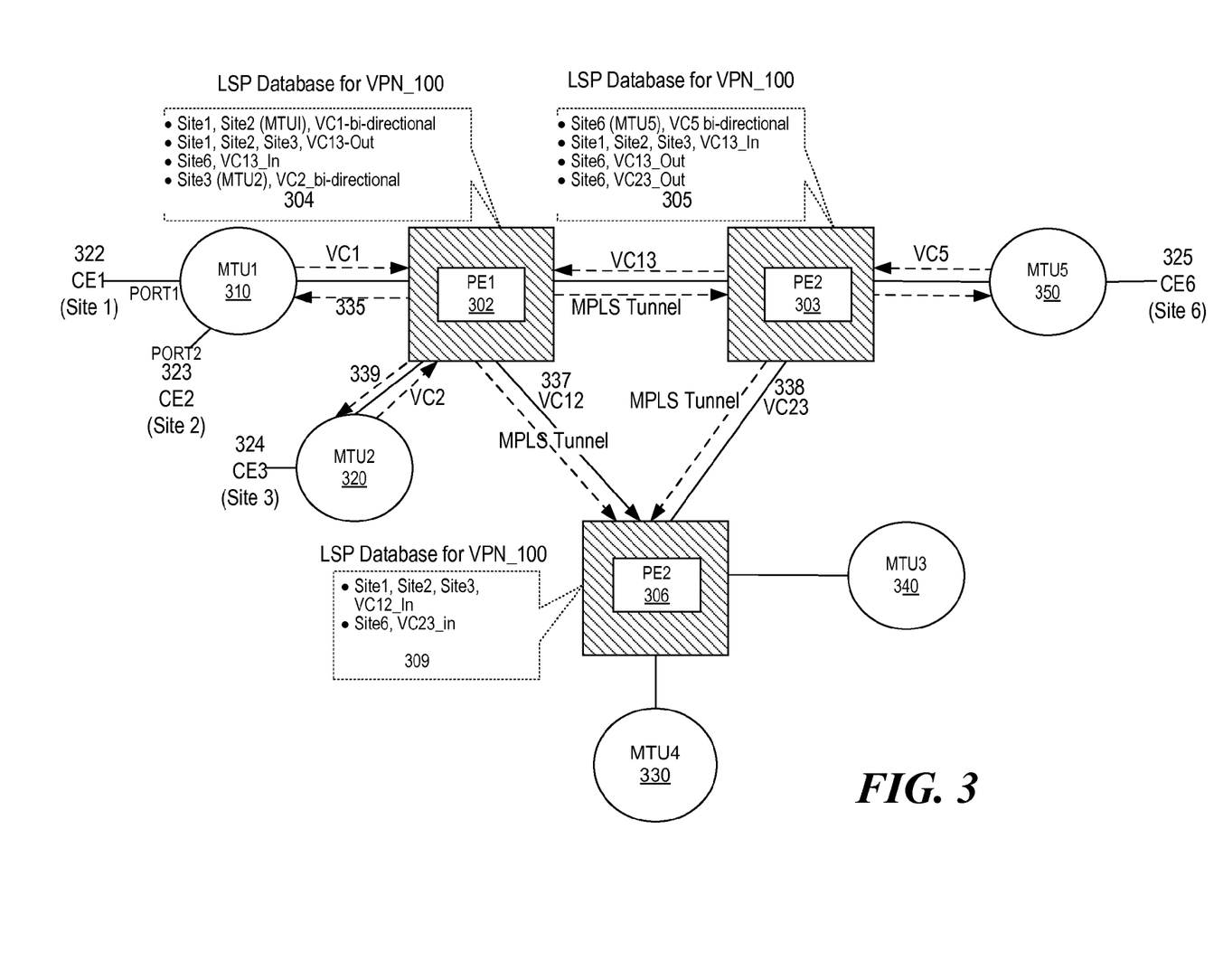
FIG. 3 is a block diagram illustrating another method for VPLS membership discovery between an MTU and its corresponding (provider edge) PE, as well as between local PE and remote PEs.

If it is desired to add another VLPS site such as site CE3 324 in FIG. 3, a second LMM with a virtual circuit label switch path such as 339, associated with the first virtual circuit label switch path 335 is configured at MTU2 320. MTU2 320 communicates the second LMM to PE device 302. The second LMM contains an updated site identification list for the addition of CE2 323 VPLS, and the second LMM is broadcast to the plurality of additional PE devices 303 and 306 by PE device 302.

Upon receipt, the information contained in the second LMM is stored in each PE device's respective database. An example of the information contained in the second LMM and stored in the respective PE devices' local databases 304, 305, and 309 is shown in the captions of FIG. 3.

Figure 4A:
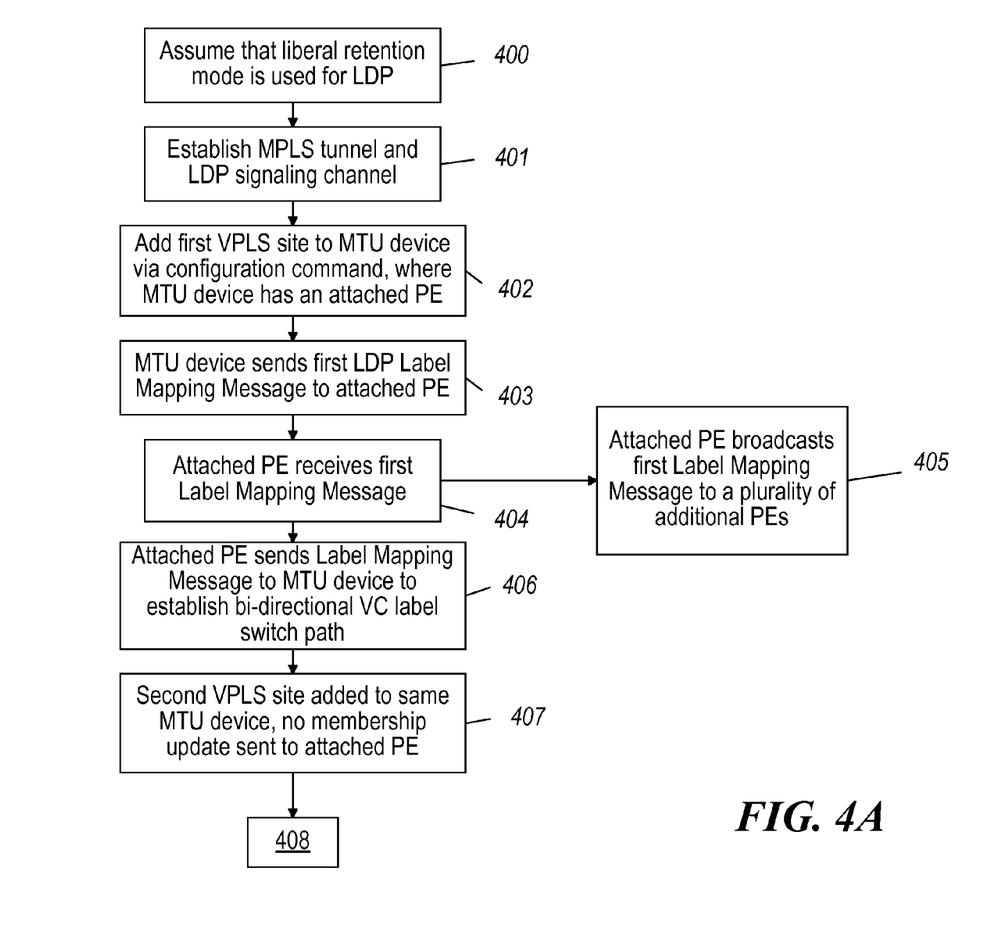
FIG. 4 is a flow diagram illustrating a method for automating VPLS membership discovery and MAC/site-ID learning in a distributed computer network.
Figure 4B:
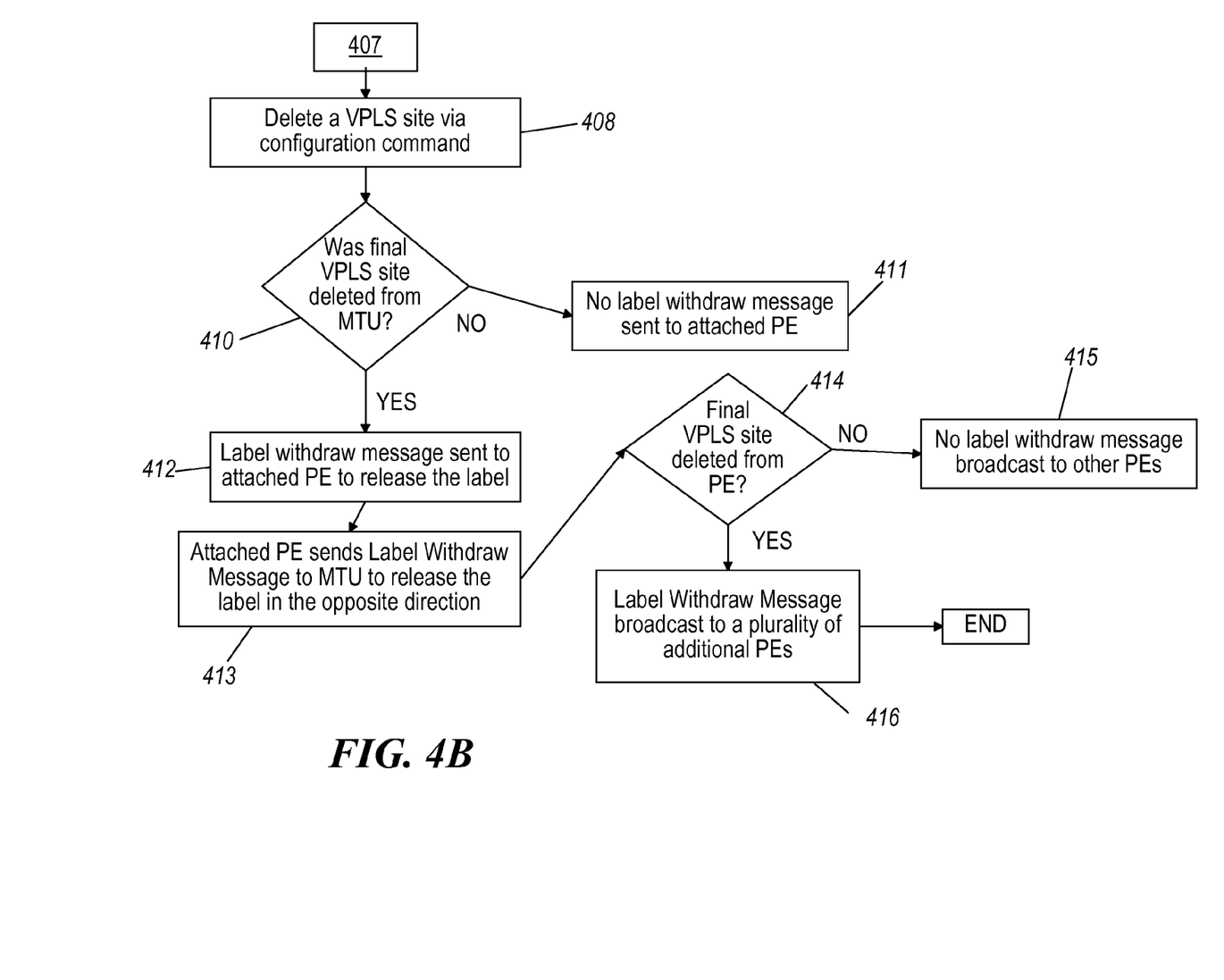

FIG. 4 is a flow diagram illustrating a method for automating VPLS membership discovery and address learning in a distributed computer network. As indicated in the topmost block 400, it is assumed that a liberal label retention mode is used for the label data paths (LDPs) between provider edge (PE) devices. In step 401, an MPLS tunnel and label data path (LDP) signaling channel are established. In step 402, a first VPLS site is added via a MTU device configuration command. The MTU device has an attached PE device. In step 403, the MTU device sends a first LDP label mapping message (LMM) to the attached PE. In step 404, the attached PE receives the first LMM and, in step 405, broadcasts the first LMM to a plurality of additional PEs.

In step 406, the attached PE sends a label mapping message to the MTU device to establish a bi-directional virtual circuit (VC) label switch path. In step 407, a second VPLS is added to the same MTU device, thus no membership update is sent to the attached PE. Should another VPLS be added to a different MTU, an LMM updating membership would be generated, communicated, and stored by the local databases associated with the peering PEs.

In step 408, a VPLS site is deleted via an MTU configuration command. In step 410, a decision as to whether this deletion is a final VPLS site deletion from the MTU is made. If it is determined that this is the final MTU VPLS deletion, then in step 412, the MTU associated with the deleted VPLS site sends a Label Withdraw Message to its attached PE device to release the label. In step 413, the attached PE sends a Label Withdraw Message to the MTU to release the label in the opposite direction.

If it is determined in step 410 that the VPLS deletion is not the final deletion from an MTU, then in step 411, no Label Withdraw Message is sent to the attached PE device. In step 414, a decision is made as to whether a final VPLS site has been deleted from the PE device. If the determination is 'Yes,' then in step 416, a Label Withdraw Message is broadcast to a plurality of additional PE devices (peers). If the determination in step 414 is no, then no Label Withdraw Message is broadcast to the plurality of other PE devices, as in step 415.

Figure 5A:
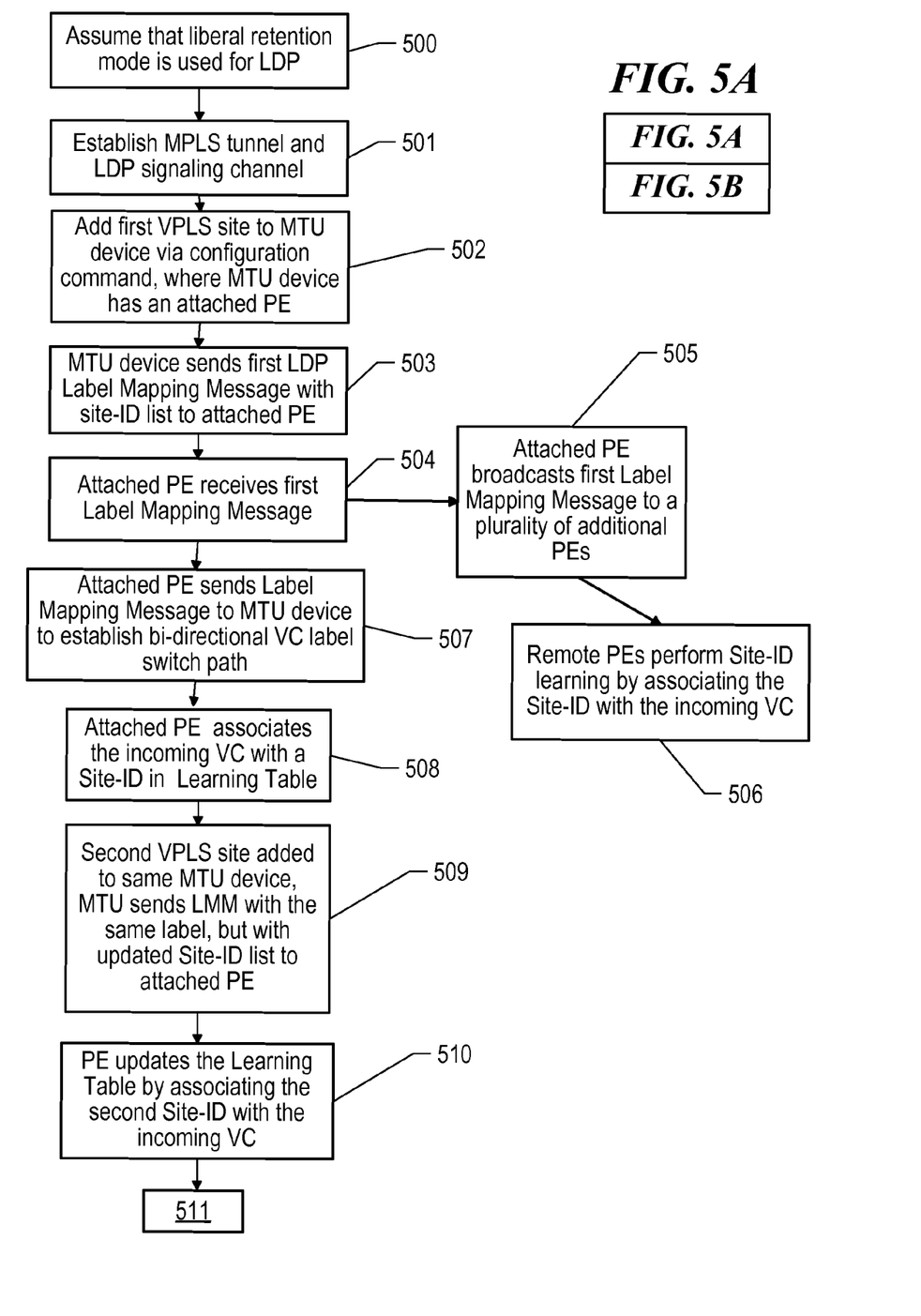
FIG. 5 is a flow diagram illustrating another method for automating VPLS membership discovery and site-ID learning.
Figure 5B:
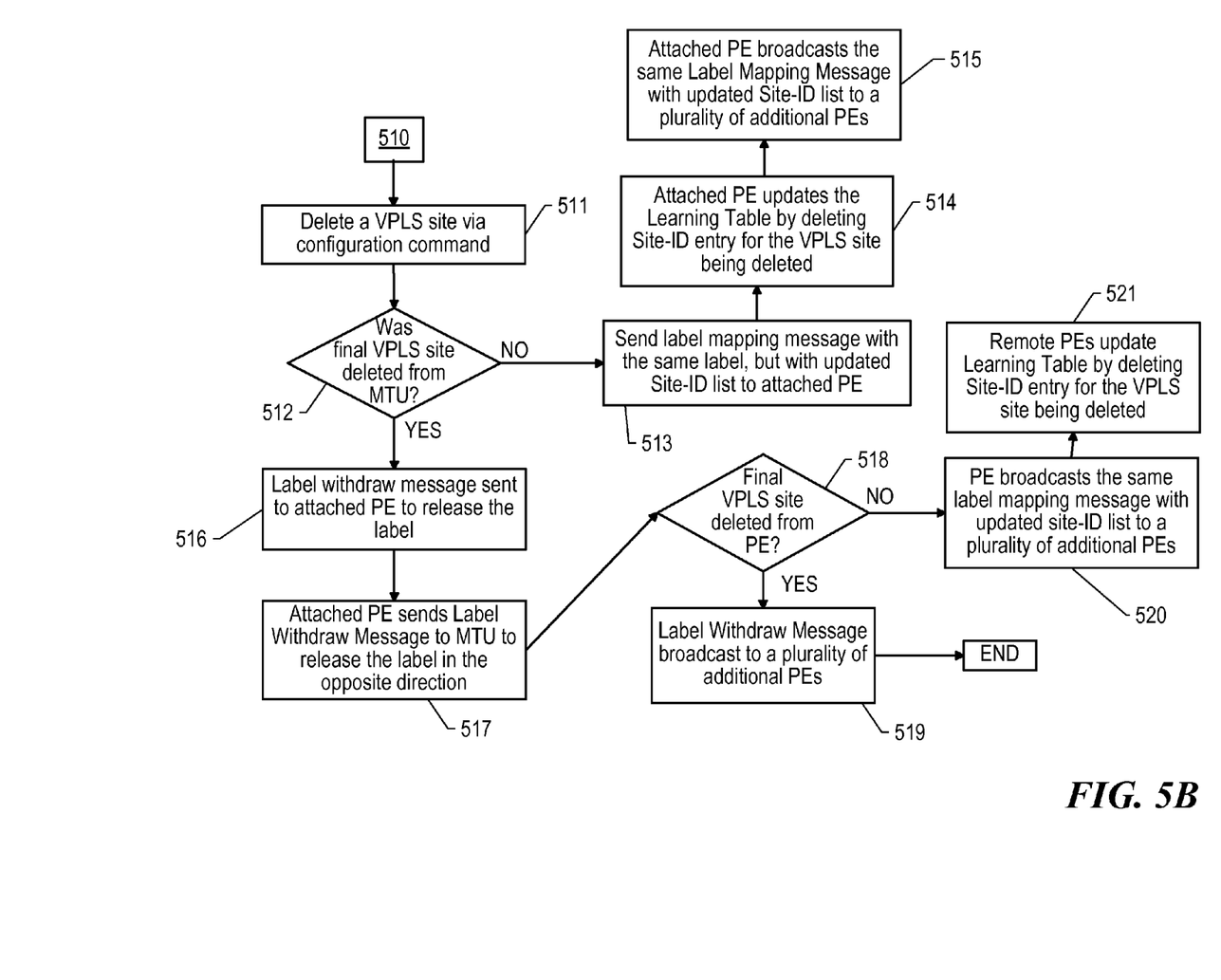

FIG. 5 is a flow diagram illustrating another method for the automatic discovery of VPLS sites and address learning. As indicated in the topmost block 500, it is assumed that liberal label retention mode is used for the label distribution paths (LDP) between provider edge (PE) devices. In step 501, a MPLS tunnel and LDP signaling channel are established. In step 502, a first VPLS site is added via a MTU device configuration command. The MTU device has an attached PE device. In step 503, the MTU device sends a first LDP label mapping message (LMM) with a site identification (site-ID) list to the attached PE. In step 504, the attached PE receives the first LMM and, in step 505, broadcasts the first LMM to a plurality of additional remote PE devices. In step 506, the remote PE devices perform site-ID learning by associating the site-ID with the incoming virtual circuit (VC).

In step 507, the attached PE device sends a LMM to its MTU device to establish a bi-directional virtual circuit (VC) label switch path. In step 508, the attached PE device associates the incoming VC with a site-ID in a learning table. In step 509, a second VPLS site is added to the same MTU device, and the MTU device sends an LMM with the same label, but with an updated site-ID list to its attached PE device. In step 510, the PE updates the learning table by associating the second site-ID with the incoming VC.

In step 511, a VPLS site is deleted via an MTU device configuration command. A decision is made in step 512 as to whether this VPLS deletion is a final deletion from the MTU. If 'No,' then in step 513, a LMM with the same label, but an updated site-ID list is sent to the attached PE device. In step 514, the attached PE updates the learning table by deleting the site-ID entry for the VPLS site being deleted. The attached PE device then broadcasts the LMM with the updated site-ID list to a plurality of additional provider edge devices in step 515.

If the answer in step 512 is 'Yes,' then in step 516, a Label Withdraw Message is sent to the MTU's attached PE device to release the label, and in step 517, the attached PE device sends a Label Withdraw Message to the MTU to release the label in the opposite direction.

A final VPLS site to be deleted from the PE device determination is made in decision step 518. If the final deletion answer is 'Yes,' then a Label Withdraw Message is broadcast by the PE device in step 519 to a plurality of additional PE devices (peers). If the answer is 'No," then in step 520, the PE device broadcasts the same LMM with an updated site-ID list to a plurality of additional PE devices. In step 521, the remote PE devices update their learning tables by deleting the site-ID entry for the VPLS site being deleted.

Figure 6:
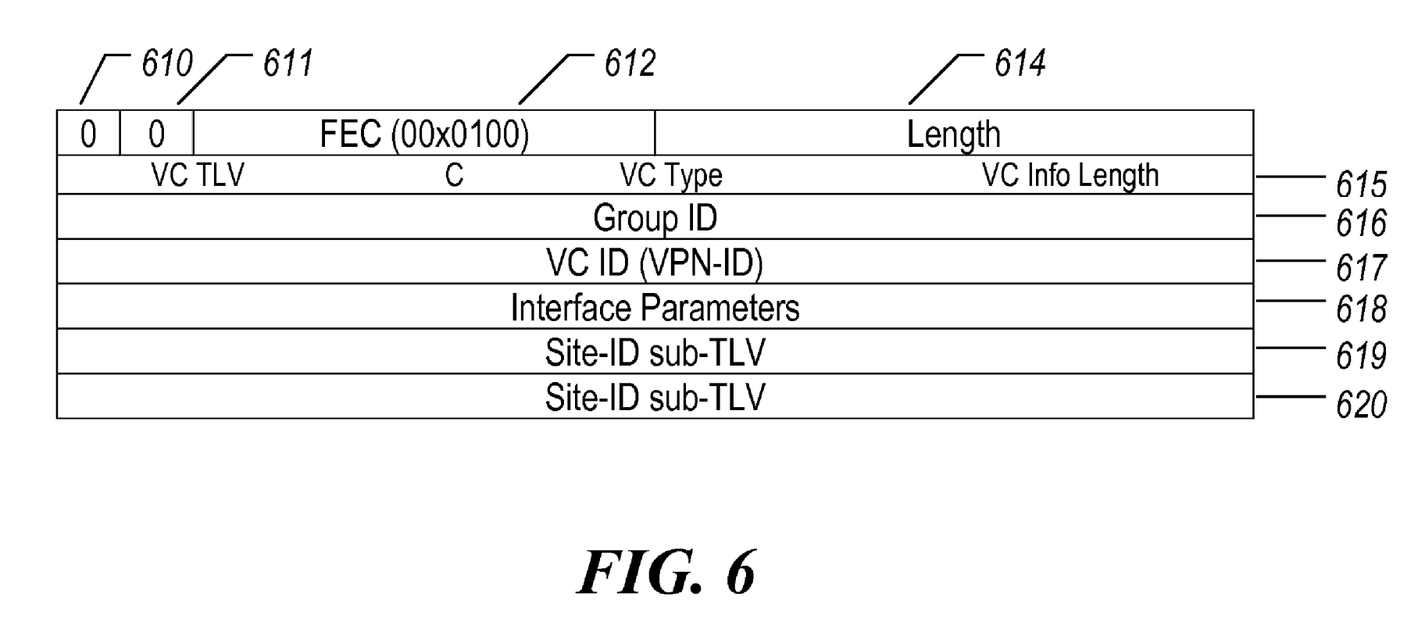
FIG. 6 is a block diagram illustrating a FEC (forwarding equivalence class) field to represent a MPLS virtual circuit for VPLS membership discovery between an MTU and its corresponding (provider edge) PE, as well as between local PE and remote PEs.

FIG. 6 is a general diagram illustrating an example of a virtual circuit field equivalence class (VC-FEC) packet of the present invention. This type of packet may be communicated by the LMM as discussed in the various embodiments presented herein. The VC-FEC comprises an unknown bit 610 and a forward bit 611, a FEC TLV type 612, and length information 614. Field 615 identifies a virtual circuit (VC) encapsulation type, e.g., frame relay, Ethernet, VLAN, ATM VCC transport, while field 616 identifies a group identification (ID) element. The 32-bit Group ID 616 represents a group of VCs if there is no VC ID present. Another field 617 identifies a virtual circuit (VC) connection identification (ID). An interface parameter field 618 defines a multi tenant unit device parameter. Sub-tag length value fields 619, 620 are used to specify a particular site identifier (site-ID) associated with origination of the VC-FEC packet. A site identifier could identify the provider's media access control (MAC).

Figure 7:
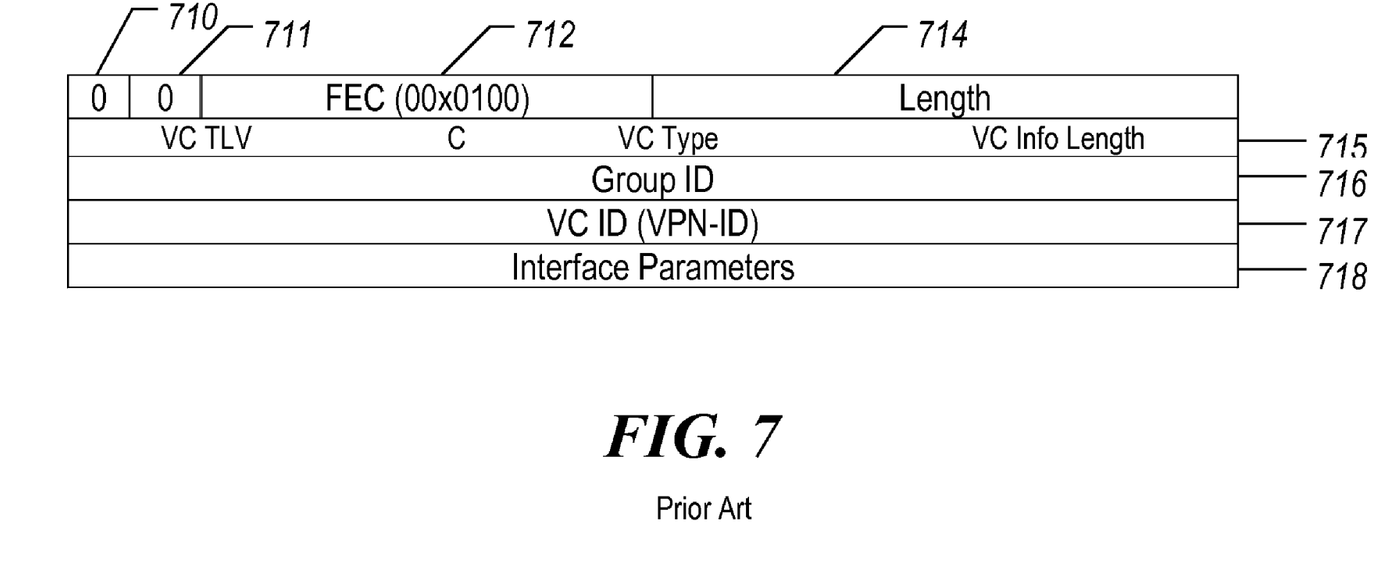
FIG. 7 is a block diagram illustrating a prior art FEC field to represent a MPLS virtual circuit utilized for VPLS membership discovery between an MTU and its corresponding PE device, as well as between local and remote PEs.

FIG. 7 is a general diagram illustrating another example of a VC-FEC packet. Complete specifications for the VC-FEC packet of FIG. 7 are contained in the Internet Engineering Task Force (IETF) LDP Specification (RFC 3036). The VC-FEC packet of FIG. 7 is utilized in embodiments of the methods disclosed herein. For example, the various label mapping messages (LMMs) may communicate the packet of FIG. 7, or may communicate the VC-FEC packet of FIG. 6. Which packet is utilized depends upon whether address learning is to be accomplished in the data plane, e.g. address learning conducted with packet forwarding (packet of FIG. 7), or whether the auto discovery and address learning processes are performed together (packet of FIG. 6).

The VC-FEC of FIG. 7 comprises an unknown bit 710 and a forward bit 711, a FEC TLV type 712, and length information 714. Field 715 identifies a virtual circuit (VC) encapsulation type, e.g., frame relay, Ethernet, VLAN, ATM VCC transport, while field 716 identifies a group identification (ID) element. The 32-bit Group ID 716 represents a group of VCs if there is no VC ID present. Another field 717 identifies a virtual circuit (VC) connection identification (ID). Field 718 defines interface parameters for multi tenant unit devices.

The embodiments discussed with reference to FIGS. 6 and 7 of VC-FEC packets are utilized within a multi-protocol label switching (MPLS) system comprising a first computing node and a second computing node coupled to the first computing node. The second computing node receives and stores a VC-FEC packet for use in automatic membership discovery.

The above disclosed subject matter is to be considered illustrative, and not restrictive and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of automating virtual private local area network service membership discovery, the method comprising:
   establishing a multi-protocol label switching tunnel and targeted label distribution protocol signaling channel between a first provider edge device and a plurality of provider edge devices;

adding a first virtual private local area network service site to a multi-tenant unit device associated with the first provider edge device;

receiving a first label distribution protocol label mapping message at the first provider edge device from the multi-tenant unit device;

broadcasting the first label distribution protocol label mapping message to the plurality of provider edge devices from the first provider edge device;

sending a second label distribution protocol label mapping message to the multi-tenant unit device from the first provider edge device to establish a virtual circuit label switch path between the multi-tenant unit device and the first provider edge device;

adding a second virtual private local area network service site to the multi-tenant unit device without sending an associated label distribution protocol label mapping message to the first provider edge device; and deleting a respective one virtual private local area network service site of the first virtual private local area network service site or the second virtual private local area network service site using a configuration command, wherein the multi-tenant unit device determines whether deleting the respective one virtual private local area network service site is a final deletion of the respective virtual private local area network service site attached to the multi-tenant unit device.

2. The method of claim 1, further comprising sending a first label withdraw message to the first provider edge device based on the final deletion determination.

3. The method of claim 2, further comprising sending a second label withdraw message to the multi-tenant unit device from the first provider edge device based on sending the first label withdraw message.

4. The method of claim 1, further comprising adding another virtual private local area network service site to a second multi-tenant unit device associated with a remote provider edge device, wherein the remote provider edge device broadcasts a label distribution protocol label mapping message to the first provider edge device to establish a virtual circuit label switch path between the first provider edge device and the remote provider edge device.

5. The method of claim 1, wherein the first provider edge device performs address learning in regards to the virtual circuit label switch path between the multi-tenant unit device and the first provider edge device.

6. The method of claim 4, wherein the plurality of provider edge devices perform address learning in regards to the virtual circuit label switch path between the first provider edge device and the remote provider edge device.

7. A method for automating membership discovery in a virtual provider local area network service network, the method comprising:

establishing a virtual circuit label switch path between a multi-tenant unit and a provider edge device attached to the multi-tenant unit, the virtual circuit label switch path associated with a first virtual private local area network service site;

establishing a virtual circuit label switch path between a local provider edge device and a remote provider edge device;

transmitting a first label mapping message from the multi-tenant unit to the attached provider edge device, wherein, in response to receiving the first label mapping message, the attached provider edge device establishes a bi-directional virtual circuit label switch path to the multi-tenant unit and performs address learning;

adding a second virtual private local area network service site to the virtual provider local area network service network, wherein the second virtual private local area network service site is attached to the multi-tenant unit; and transmitting a second label mapping message from the multi-tenant unit to the attached provider edge device, the second label mapping message having a virtual circuit label associated with the virtual circuit label switch path between the multi-tenant unit and the provider edge device.

8. The method of claim 7, further comprising broadcasting the first label mapping message from the attached provider edge device to a plurality of provider edge devices.

9. The method of claim 8, wherein the first label mapping message comprises a virtual circuit forwarding equivalence class field.

10. The method of claim 7, wherein the first label mapping message has a common virtual circuit label with respect to the second label mapping message and wherein at least one of the first label mapping message and the second label mapping message has an updated site identification list.

11. The method of claim 7, further comprising associating the virtual circuit label switch path between the multi-tenant unit and the attached provider edge device with a site identification number in a learning table.

12. A method for automating membership discovery in a distributed network, the method comprising:

establishing a virtual circuit label switch path between a multi-tenant unit and a provider edge device attached to the multi-tenant unit, the virtual circuit label switch path associated with a first virtual private local area network service site;

populating an address learning table;

receiving, at the attached provider edge device, a first label mapping message;

performing address learning in response to receiving the first label mapping message;

transmitting the first label mapping message from the attached provider edge device to the multi-tenant unit to establish a bi-directional virtual circuit label switch path;

broadcasting the first label mapping message from the attached provider edge device to a plurality of provider edge devices;

broadcasting a second label mapping message from the attached provider edge device to the plurality of provider edge devices after receiving the second label mapping message; and adding a second virtual private local area network service site to the distributed network, wherein the second virtual private local area network service site is attached to the multi-tenant unit.

13. The method of claim 12, further comprising creating a site identification table.

14. The method of claim 13, wherein the first label mapping message comprises a virtual circuit forwarding equivalence class field.

15. The method of claim 12, further comprising forwarding a packet based upon the address learning table.

* * * * *